Feb. 19, 1957  L. J. RICHEROD  2,781,551
METHOD OF MAKING HOLLOW CONTAINERS
Filed Jan. 5, 1952
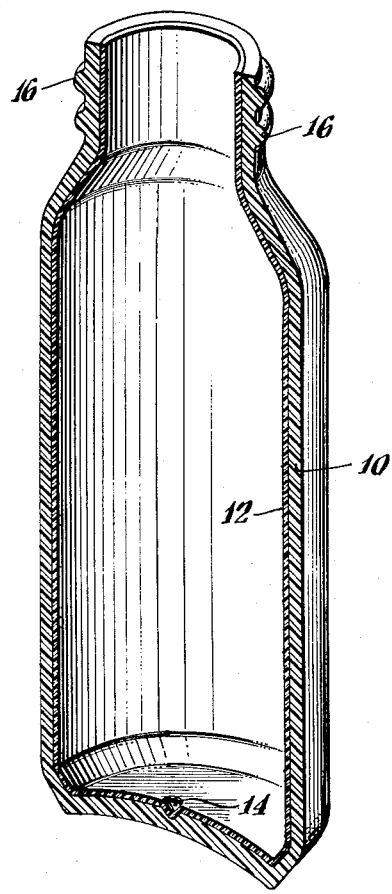
INVENTOR.
*Louis J. Richerod*
BY
*Eyre, Mann & Durum*
ATTORNEYS

United States Patent Office 2,781,551
Patented Feb. 19, 1957

2,781,551
METHOD OF MAKING HOLLOW CONTAINERS

Louis J. Richerod, Adrogue, Argentina

Application January 5, 1952, Serial No. 265,149

5 Claims. (Cl. 18—55)

Bottles with flexible side walls made up of polyethylene are now on the market for use as containers for various pharmaceutical and cosmetic preparation. Polyethylene is scarce and expensive, and accordingly attempts have been made to produce bottles of this type from the vinyl resins such as vinyl chloride and the like. This has not been satisfactory, as the vinyl resins tend to become stiff and hard. I believe that a primary cause of this stiffening is the fact that the types of materials used in such bottles ordinarily contain solvents which act on the plasticizers for the vinyl resins and gradually extract these plasticizers from the resin.

According to the present invention I produce a bottle which has sufficient softness for the intended purpose and which remains soft and which has a better appearance than the ordinary polyethylene bottle; also it lends itself more readily to surface embossing, printing or decoration. I accomplish this result by forming a composite tube which ordinarily will have a major thickness of vinyl resin and an inner thinner layer of polyethylene. This composite tube may be produced in any desired way as by rolling out a composite sheet and then forming a tube out of it or preferably the composite sheet is formed as a tube by double extrusion with the polyethylene on the inside. In either case the two sheets are mechanically pressed together by this first operation.

The composite tube is put in the regular blowing machine and heated to a temperature proper for blowing the vinyl resin. The polyethylene should have a slightly lower softening point than the vinyl resin so that it will flow quite readily as the vinyl resin is being shaped. When the composite sheet is blown under these conditions the two sheets are held tightly compressed together by the fluid pressure while at the same time the materials of the two sheets are caused to flow as an incident to the stretching. As a result of this mechanical movement of the two sheets while they are held compressed together by the fluid pressure which acts over the entire exposed surface simultaneously, a very close and tight bond will be formed between the two layers even though it is probable that there is little, if any, actual molecular interlocking. In any event, the bond is firm enough so that the bottle formed of the composite material will remain soft for a sufficient period to cover ordinary usage. The desired difference in softening points is somewhat difficult to define as the values are not definite and this difference may range for example between 5 degrees C. and 20 degrees C. A difference of 10 degrees C. is a good working rule.

In making a product of this type there is one point which should be given attention and that is that the plasticizer selected for the vinyl resin should not be one that acts upon the polyethylene, otherwise the polyethylene may draw a part of this plasticizer out of the vinyl layer. Those skilled in the art will readily be able to select an appropriate plasticizer but I may mention by way of example the polyester resin type plasticizers such as those sold under the trade names Paraflex G 25 and Paraflex C 50, the chlorinated paraffin plasticizers such as the one sold under the name Chlorowax 70, or nitrite rubber such as the product sold under the name Hycar 25.

It is understood that these are given only by way of suggestion and that many other types or combinations of types may be used.

I have not described in detail the methods of making a composite sheet or making a composite tube of the two materials, for the rolling or double extrusion processes are well-known in the industry, as for example in making multi-colored plastic products of a single type of resin. The final operation of blowing the composite material to form the bottle or container is also standard, subject to the provision already pointed out that the temperature employed should be one suited to the vinyl compound and such that the polyethylene will be even softer. The novelty resides in first assembling the two layers of material in close association and then causing them to form a tight and firm bond by blowing them simultaneously with the pressure transmitted through the polyethylene to the vinyl resin.

When I refer to vinyl resins in this application, I intend to include any of the various vinyl compounds which are used for making hollow articles and the nature of which is well-known in the industry.

Also this application may be used for making flexible tubes of the type ordinarily used for pastes or creams which are closed at the bottom after filling and provided with a removable closure cap at the top. My invention makes it possible to use a somewhat less plasticized vinyl resin for the top portion where added stiffness is desirable.

This invention may be readily understood from the following illustrative example:

A mass of vinyl chloride was plasticized with a polyester resin plasticizer (Paraflex G 25) in such manner as to have a softening point of about 10 degrees C. above the softening point of the polyethylene used (which in one case was about 155 degrees C.). A double-walled cylinder was then extruded from these materials with the vinyl chloride on the outside and the polyethylene on the inside. The wall of the extruded tube had a thickness of 2 mm. of vinyl chloride and 0.5 mm. of polyethylene. Sections of this tube were then put in a usual bottle blowing machine and blown in the usual manner to form a bottle. At the bottom the tube was pinched together so that the layers of polyethylene met each other. At the top the polyethylene came out to the lip of the bottle. This bottle showed very close adherence of the walls to each other so that there was no tendency to separate in use and the walls remained flexible over a long period of time even when used for alcoholic solutions.

Such a bottle is illustrated in the accompanying drawing which shows the bottle in vertical section. In this drawing 10 is the layer of vinyl chloride and 12 is the layer of polyethylene. The seal at the bottom of the bottle is indicated at 14. It is to be noted that the vinyl chloride readily lends itself to molding conformation, as for example the external threads indicated at 16.

It is understood that the foregoing example is given only by way of illustration and is not intended to limit my invention.

What I claim is:

1. The method of forming a tubular member of integrated polyethylene and vinyl resin which is adapted to be used as a container, which comprises mechanically compressing to a sheet of polyethylene a sheet of vinyl resin plasticized to render it flexible but with a slightly higher softening point than the polyethylene, forming such composite mass into a tube with the polyethylene inside, heating such tube to a temperature at which the vinyl resin can be stretched and at which the polyethylene will flow readily under pressure, and while so heated expanding such tube by internal fluid pressure whereby the vinyl resin is caused to stretch to the desired shape and the polyethylene liner is caused to flow to keep the inside surface of the vinyl resin covered and to unite with the vinyl resin to form a substantially integral sheet so that the tubular member will remain flexible with no tendency for the layers to separate in use.

2. A method as specified in claim 1 in which one end of the tube is closed as an incident to the expanding operation whereby a container is formed.

3. A method as specified in claim 1 in which the vinyl resin is plasticized to have a softening point between 5° C. and 20° C. above that of the polyethylene.

4. A method as specified in claim 1 in which the plasticizer for the vinyl resin is such that it does not act on the polyethylene.

5. A method as specified in claim 1 in which the tube formed of the two materials is formed with the vinyl layer more than twice as thick as the polyethylene layer.

References Cited in the file of this patent

UNITED STATES PATENTS

| | | |
|---|---|---|
| 1,166,862 | Smoot | Jan. 4, 1916 |
| 1,588,933 | Bolger | June 15, 1926 |
| 1,871,982 | Geyer | Aug. 16, 1932 |
| 2,128,239 | Ferngren | Aug. 30, 1938 |
| 2,209,570 | Kraft | July 30, 1940 |
| 2,248,898 | Ross | July 8, 1941 |
| 2,315,478 | Parkhurst | Mar. 30, 1943 |
| 2,515,093 | Mills | July 11, 1950 |
| 2,584,722 | London | Feb. 5, 1952 |
| 2,597,558 | Bailey | May 20, 1952 |
| 2,648,099 | Dunmire | Aug. 11, 1953 |